(12) United States Patent
Fischer (10) Patent No.: US 10,766,038 B2
(45) Date of Patent: Sep. 8, 2020

(54) CRYOGENIC GRINDING APPARATUS AND PROCESS

(71) Applicant: Josef Fischer, Bobingen (DE)

(72) Inventor: Josef Fischer, Bobingen (DE)

( * ) Notice: Subject to any disclaimer, the term of this patent is extended or adjusted under 35 U.S.C. 154(b) by 683 days.

(21) Appl. No.: 15/233,638

(22) Filed: Aug. 10, 2016

(65) Prior Publication Data

US 2017/0056890 A1   Mar. 2, 2017

(30) Foreign Application Priority Data

Aug. 27, 2015   (EP) .................................. 15020143

(51) Int. Cl.
*B02C 19/18* (2006.01)
*B29B 17/04* (2006.01)
*B02C 23/14* (2006.01)
*B02C 23/34* (2006.01)
*B02C 23/12* (2006.01)
*B02C 25/00* (2006.01)
(Continued)

(52) U.S. Cl.
CPC ............ *B02C 19/186* (2013.01); *B02C 23/12* (2013.01); *B02C 23/14* (2013.01); *B02C 23/20* (2013.01);
(Continued)

(58) Field of Classification Search
CPC ....... B02C 19/186; B02C 23/12; B02C 23/14; B02C 23/20; B02C 23/34; B02C 23/40;
(Continued)

(56) References Cited

U.S. PATENT DOCUMENTS

| 2,609,150 A | * | 9/1952 | Bludeau | ................ B02C 19/186 241/15 |
| 3,771,729 A | * | 11/1973 | Frable | ................... B02C 19/186 241/65 |

(Continued)

FOREIGN PATENT DOCUMENTS

| DE | 91 09 608.1 U1 | 10/1991 |
| DE | 90 12 238.0 U1 | 12/1991 |

(Continued)

*Primary Examiner* — Adam J Eiseman
*Assistant Examiner* — Mohammed S. Alawadi
(74) *Attorney, Agent, or Firm* — Falk Ewers; Ewers IP Law PLLC (57) ABSTRACT

A cryogenic grinding apparatus is provided. The apparatus includes a material charge, a low-temperature embrittling device for embrittling the charged ground material by supplying liquid low-temperature gas, a mill for grinding the low-temperature embrittled ground material in an atmosphere containing the low-temperature gas, and a separating device. The separating device has a wind classifier, a removal device to remove the ground material from the mill-output volumetric flow, and a directing device to feed the removed ground material into a classifier-input volumetric flow and to discharge excess mill-output gas of the mill-output volumetric flow. In addition, a cryogenic grinding process is provided in which the ground material is removed from the volumetric flow, excess grinding gas is discharged, removed ground material is feed into a classifier-input volumetric flow of a wind classifier and a classifier-input volumetric flow is classified for separating off a classifier-output volumetric flow containing the fine material.

19 Claims, 2 Drawing Sheets

(51) Int. Cl.
*B02C 23/40* (2006.01)
*B02C 23/20* (2006.01)
*B29B 17/02* (2006.01)

(52) U.S. Cl.
CPC .............. *B02C 23/34* (2013.01); *B02C 23/40* (2013.01); *B02C 25/00* (2013.01); *B29B 17/04* (2013.01); *B29B 17/0408* (2013.01); *B29B 2017/0416* (2013.01); *Y02W 30/625* (2015.05)

(58) Field of Classification Search
CPC ..... B02C 25/00; B29B 17/04; B29B 17/0408; B29B 2017/0416; B29B 17/02; B29B 2017/0231; Y02W 30/625
USPC ................. 241/DIG. 37, 79.1, 57, 62, 65
See application file for complete search history.

(56) References Cited

U.S. PATENT DOCUMENTS

| | | | | |
|---|---|---|---|---|
| 4,073,443 A * | 2/1978 | Danioni | ................ | B02C 18/148 241/65 |
| 4,222,527 A * | 9/1980 | Davis | ..................... | A23G 1/047 241/33 |
| 4,528,091 A | 7/1985 | Nied et al. | | |
| 4,550,879 A * | 11/1985 | Tanaka | .................... | B02C 13/14 241/52 |
| 5,588,600 A * | 12/1996 | Perfido | .................. | B29B 17/02 241/152.1 |
| 6,076,752 A * | 6/2000 | Paradowski | ......... | B02C 19/186 241/16 |
| 6,334,332 B1 * | 1/2002 | Yamamoto | ............ | B02C 19/186 62/335 |
| 7,445,170 B2 | 11/2008 | Cialone et al. | | |
| 2009/0032628 A1 * | 2/2009 | Mangelberger | ......... | B02C 23/12 241/79.1 |
| 2016/0121333 A1 * | 5/2016 | Pallmann | ............ | B02C 13/1835 241/18 |

FOREIGN PATENT DOCUMENTS

DE 10 2005 001 542 A1 7/2006
EP 0787528 B1 8/1997

* cited by examiner

CRYOGENIC GRINDING APPARATUS AND PROCESS

CROSS REFERENCE TO RELATED APPLICATION

This application claims priority of European patent application no. 15020143.2, filed Aug. 27, 2015, the entire content of which is incorporated herein by reference.

FIELD OF THE INVENTION

The invention relates to a cryogenic grinding apparatus and to a cryogenic grinding process.

BACKGROUND OF THE INVENTION

Cryogenic grinding is used for comminuting materials that are difficult to comminute, such as for example for producing powdered rubber from rubber granules. In this case, the coarse material to be ground is fed to a low-temperature embrittling device, for example in the form of a cooling screw, in which the coarse material is cooled down with a gas supplied in a liquid state, for example liquid nitrogen, and embrittled, so that it becomes friable. Then the material is charged to a mill and is ground. However, the ground material thus obtained contains many fineness fractions. In order to obtain a specific fraction of the ground material, generally the fine fraction, the ground material is then dried or heated and charged to a screening device, at which the fine fraction is sifted out. A corresponding apparatus and a corresponding process is known for example from U.S. Pat. No. 7,445,170.

It is disadvantageous there that the ground material has to be heated to allow it to be screened and that there is a downward limit on the achievable separation cut, since with finer mesh widths the screen deck becomes clogged. Also, if there are changes to the desired end fineness, the complete screen deck has to be exchanged.

For separating off a fine material fraction from a heterogeneous mixture of different grain sizes, so-called wind classifiers are also known. Examples of these wind classifiers can be found in U.S. Pat. No. 4,528,091 and in German patent application DE 10 2005 001 542 A. Wind classifiers have one or more classifier wheels arranged above a classifier chamber. Particles of the material to be classified are entrained by an upwardly directed air stream in the classifier chamber or, if the particles are too heavy, the particles are not entrained. Of the lighter particles that reach the classifier wheel, only those particles that are smaller than the upper grain limit defined by the classifier wheel pass the classifier wheel. The other particles fall back.

Mill/classifier combinations are also already known from non-cryogenic applications. In these cases, the ground material is blown through the mill to the classifier by large amounts of compressed air, which makes them appear to be unsuitable for use for cryogenic grinding, because of the temperature control of the mill and the associated pressure fluctuations in the gas/particle stream flowing out of the mill, and because it is not possible in this case for any amounts whatsoever of relatively warm compressed air to be blown in.

An example of such a classifier mill is known from U.S. Pat. No. 4,550,879, which shows a pencil-wheel hammer mill that is arranged upstream of the wind classifier and by which the charged material is blown upward through the mill into the classifier chamber of the wind classifier by compressed air. A classifier mill with a whirlwind mill and a classifier wheel arranged vertically above it is disclosed in German utility model specifications DE 910 96 08 U1 and DE 901 22 38 U1. Here too the ground material is transported to the classifier wheel by a lot of air that is additionally blown in.

SUMMARY OF THE INVENTION

It is an object of the present invention to further improve the known cryogenic grinding apparatuses and processes to lower the consumption of energy and to achieve a greater level of fineness of the fine material produced by the use of wind classifiers.

The object is achieved by providing a cryogenic grinding apparatus having: a material charge for charging the material to be ground; a low-temperature embrittling device connected to said material charge and configured for embrittling the charged material to be ground at a low temperature by supplying a liquid low-temperature gas; a mill connected to said low-temperature embrittling device and configured for grinding the embrittled material to be ground in an atmosphere containing the supplied liquid low-temperature gas; a separating device configured for separating the fine material from a mill-output volumetric flow leaving the mill; said mill-output volumetric flow containing the liquid low-temperature gas and ground material; said separating device including a wind classifier configured for separating off a classifier-output volumetric flow containing the fine material from a classifier-input volumetric flow containing the ground material; a removal device connected to the mill and configured for removing the ground material from said mill-output volumetric flow; and, a directing device configured for feeding the removed ground material into said classifier-input volumetric flow and to discharge excess mill-output gas of said mill-output volumetric flow.

The object is further achieved by providing a cryogenic grinding process including the steps of: charging the material to be ground;

low-temperature embrittling the charged material to be ground subsequent to the charging by supplying liquid low-temperature gas; grinding low-temperature-embrittled material to be ground subsequent to the low-temperature embrittling in an atmosphere containing the supplied liquid low-temperature gas; separating the fine material from a volumetric flow subsequent to the grinding; said volumetric flow including ground material and a grinding gas containing the liquid low-temperature gas; said separating including substeps of: removing the ground material from the volumetric flow; discharging excess grinding gas; feeding the removed ground material into a classifier-input volumetric flow of a wind classifier; feeding a feed gas fraction of the excess grinding gas that is necessary for at least one of creating and maintaining a desired low-temperature gas fraction in an atmosphere in said wind classifier; wind classifying the classifier input volumetric flow for separating off a classifier-output volumetric flow containing the fine material in an atmosphere in the wind classifier; and said classifier input volumetric flow containing at least a desired low-temperature gas fraction.

In the case of the cryogenic grinding apparatus according to an aspect of the invention, the separating device is connected to the mill and is configured for separating off the fine material from a mill-output volumetric flow leaving the mill and containing the low-temperature gas and the ground material or ground charged material. The separating device has a wind classifier to separate off ground material particles that are below an upper grain limit in terms of size from a classifier-input volumetric flow arriving at the classifier. The classifier-input volumetric flow is a volumetric flow arriving at the classifier. However, such wind classifiers require a relatively uniform air/gas-input volumetric flow as classifier-input volumetric flow. Since the mill-output volumetric flow leaving the mill is subject to fluctuations in pressure, density and flow rate caused by the operation of the cryogenic mill, in particular caused by the temperature control, and since the wind classifier cannot operate under such fluctuating conditions, or can only poorly operate under such fluctuating conditions, the separating device has a removing device, which is arranged between the mill and the wind classifier and at which the ground material is removed from the mill-output volumetric flow. A directing device feeds the removed ground material into the classifier-input volumetric flow and discharges excess mill-output gas from the mill-output volumetric flow into the surroundings surrounding the cryogenic grinding apparatus and/or, if desired, returns it to the mill input side and thereby reuses it.

Correspondingly, in the case of the cryogenic grinding process according to an aspect of the invention, the process step of separating the fine material from the mill-output volumetric flow includes multiple substeps. The substeps include discharging excess grinding gas from the mill-output volumetric flow, removing the ground material therefrom, feeding the ground material into a classifier-output volumetric flow, and wind classifying the classifier-input volumetric flow to separate off from it a classifier-output volumetric flow with those ground material particles that are below the predetermined or predeterminable upper grain limit in terms of size, and consequently form the fine material. The classifier-output volumetric flow is a volumetric flow separated off from the classifier-input volumetric flow by wind classifying.

The critical fluctuations in the mill-output volumetric flow may in this case occur for example because the mill that is used for the cryogenic grinding, such as for example a whirlwind mill, has a temperature control, which variably controls the amount of low-temperature medium that is taken up per unit of time, in order thereby to keep a temperature during the cold milling below a desired setpoint value, for example below −40° C. to −70° C. Therefore, if the temperature in the mill increases, more low-temperature medium is supplied, so that there can potentially be fluctuations over time in the mill-output volumetric flow. Due to the changing of the amount of refrigerating medium caused by the temperature control of the mill, and as a result of the liquid refrigerating medium evaporating, at the same time a change in the volumetric flow of the gas is caused. It is therefore advantageous for the cryogenic grinding if the mill has a mill-temperature control device, which variably controls the amount of low-temperature gas supplied per unit of time from a low-temperature gas source of the mill directly via a low-temperature gas feeding line and/or via the low-temperature embrittling device, in order to keep a temperature during the cold grinding below a desired setpoint temperature value.

According to an aspect of the invention, the mill and the wind classifier are therefore systems that are completely separate from one another in terms of flow, or with preference are connected to one another by a controllable directing device, in order to feed only a desired feed gas fraction from the mill-input volumetric flow into the classifier-input volumetric flow. In other words, the ground particles enter the classifier circulation or the classifier-input volumetric flow without the latter being adversely influenced by the fluctuations over time in the mill-output volumetric flow.

The advantages of the connecting directing device arise because it is desirable that a cryogenic atmosphere, or an atmosphere that at least is colder than the surroundings (about 20° C.), preferably colder than 0° C., and that is also inert, prevails in the wind classifier. This makes it possible to prevent the classifier wheel from sticking, to meet requirements that exist with regard to fire prevention and generally to achieve better classifying results.

Since, though they meet the temperature requirements and also have the desired inert properties, cryogenic cooling gases, such as for example nitrogen, are expensive, the classifier circuit is advantageously filled with a feed gas fraction from the mill-output volumetric flow or, should there not be any gas circulation at the classifier, the classifier-input volumetric flow is continually fed with it. Subsequently, the desired temperature or the desired inertness of the atmosphere is advantageously maintained in the wind classifier (the desired amount of oxygen in comparison with the ambient air) by further feeding in the feed gas fraction of the mill-output volumetric flow. Only relatively little feed gas is necessary if a circulating line leading back from the classifier output side to the classifier input side is provided and the classifier circuit has been filled in advance with the feed gas fraction obtained from the grinding gas. The gas fraction of the mill-output volumetric flow that is superfluous for these purposes is an excess-mill output gas and therefore advantageously released into the surroundings, without disturbing the temporal continuity of the classifier-input volumetric flow.

According to an aspect of the invention, a classifier wheel output of the wind classifier is followed by an after-separating device, in order to separate the fine material off from the classifier-output volumetric flow. The after-separating device preferably has an after-separating cyclone separator. The classifier circuit may lead through the after-separating device, so that the classifier gas—without the separated fine material—can be recycled. A blower is in this case arranged in the classifier circuit, or in the classifier circulating line that is connected to the classifier wheel output and that leads back to the classifier input side, in order to overcome the flow resistance caused by the classifier wheel.

According to another aspect of the invention, the classifier circulating line has a branch into a classifier-circuit outlet line, through which excess fractions of gas, namely gas that is too warm and/or contains too much oxygen can be discharged, that is blown off into the surroundings, while the classifier circuit is fed with the feed gas fraction from the mill-output volumetric flow.

In order to avoid contamination of the environment with dust, it is in this case advantageous to lead the classifier circulating line through an air filter or an air filter cartridge, in order to extract from the classifier gas that has already been largely freed of the fine material (cyclones have separating rates of up to 98%) the remaining solid particles contained, before the excess classifier gas fraction is blown out into the surroundings.

According to another aspect of the invention, the directing device includes a line network. The classifier-input volumetric flow is fed by the line network with a feed gas fraction of the mill output gas that is necessary for creating and/or maintaining a desired low-temperature gas fraction in an atmosphere in the wind classifier and with the removed ground material. In addition, the excess mill-output gas is discharged into the surroundings by the line network.

According to another aspect of the invention, the directing device or its line network includes a connecting line connecting the removal device and the wind classifier, in order to feed the removed ground material and the removed fraction of the low-temperature gas into the classifier-input volumetric flow. The directing device further includes a branch line branching off from the connecting line and leading to a gas-excess outlet line, in order to discharge the excess gas of the mill-output volumetric flow into the surroundings. The directing device also includes a blower arranged in the branch line to suck away the excess ground gas fraction, and an air filter upstream of the blower to prevent dust contamination of the environment.

According to yet another aspect of the invention, the directing device includes a detection device configured for detecting at least one parameter of the atmosphere prevailing in the wind classifier, such as for example the temperature and/or a content of oxygen. The directing device further includes a plurality of gas-directing actuators and a controller. The controller is configured to control the plurality of gas-directing actuators in response to the output of the detection device in such a way that the feed gas fraction of the mill-output gas that is necessary for creating and/or maintaining at least one setpoint parameter value of the wind classifier atmosphere is fed into the classifier-input volumetric flow and remain gas, namely the rest of the mill-output gas is discharged into the surroundings. Hence, the directing device is configured to smoothen the classifier-input volumetric flow over time and to set it to a desired, preferably constant, setpoint volumetric-flow value.

The low-temperature gas is supplied to the low-temperature embrittling device in a liquid state when it enters the mill connected to the low-temperature embrittling device, and is still cold when it leaves the mill as a gas fraction of the mill-output volumetric flow, in the negative two-digit degrees Celsius range or is significantly colder than the ambient temperature, and enters the classifier-input volumetric flow of the wind classifier, at least in a certain proportion, as a feed gas fraction. During the classifying operation, the entire classified material, or the ground material contained in the classifier-input volumetric flow, remains cold or significantly colder than the surroundings. With a consequently sufficiently great supply of low-temperature gas in the cryogenic temperature range well below 0° C., it therefore does not stick and, as a result, can be easily broken up and separated. A clogging of screening meshes that is problematic with existing screening machines can be avoided even with extremely high finenesses (for example below 100 microns) of the fine material to be produced, because no reagglomeration of the ground material takes place in the mill-output volumetric flow or classifier-input volumetric flow on account of the cold classification. Condensation of atmospheric humidity is ruled out by the closed circulation.

With the advantageous cryogenic grinding apparatus and the advantageous cryogenic grinding process, it is therefore possible for example to produce powdered rubber that has a fineness of below 100 microns from rubber granules charged as fresh material/coarse material, whereas upper grain limits of the fine material of 400 microns were achievable in the case of conventional installations for cryogenic rubber grinding. If a liquid inert gas, in particular liquid nitrogen, is also added to the low-temperature embrittling device as low-temperature gas and then forms substantial parts of the cold gas atmosphere in the mill and in the wind classifier, the entire installation is under inert gas conditions during the production of the fine material, for example the powdered rubber, so that as a result a fire or risk of explosion is ruled out.

Apart from controlling the temperature and the inert gas fraction in the classifier-input volumetric flow, the directing device is also advantageously configured to set the classifier-input volumetric flow to the desired setpoint volumetric flow value that is smoothened over time, and is preferably constant, independently of the mill-output volumetric flow fluctuating over time, since the latter is different from the classifier-input volumetric flow, in order to yield the aforementioned advantageous effects, such as inter alia a consistent fine-material end product.

For this purpose, the directing device may have an active control of the classifier input volumetric flow. Equally, however, passive components may be provided, or a combination of the two.

Thus, it would for example be conceivable that the directing device has in the connecting line connecting the mill and the wind classifier a fixed or controlled throttle, that is, for example a diameter constriction or a controlled proportional valve, which holds up a pulsatingly incoming mill-output volumetric flow at the moment of a high discharge output of the mill, and forces it to the gas-excess outlet, and allows it to pass through when there is a low momentary discharge output of the mill and/or when required on the classifier side.

The blower arranged in the line branch leading to the gas-excess outlet may be operated with variable power in response to a control of the classifier-input volumetric flow and/or its temperature or oxygen content. The blower upstream of the classifier-circuit outlet line may be operated in a similar manner in order to compensate for peaks of the mill-output volumetric flow.

According to a further aspect of the invention, the active open-loop or closed-loop control of the directing device, and its plurality of gas-line actuators respectively, have a controlled throttle damper or a valve in the gas-excess outlet line and the classifier-circuit outlet line.

If the classifier gas is too warm or not inert enough, the degree of opening of the two throttle dampers can be set such that the feed gas fraction fed into the classifier circuit from the mill-output volumetric flow increases. If, on the other hand, the parameters are as required, the throttle in the classifier outlet is closed and the throttle in the mill-excess outlet is completely opened.

According to yet another aspect of the invention, the ground-material particle removal device for separating gas and ground material is a cyclone separator.

Cyclone separators can remove about 98% of the solid load from the gas stream. This means that an already highly precleaned gas stream arrives at the partial-stream outlet or at the air filter arranged upstream of the latter or at the throttle or at the point of constriction in the line, so that no particles or only few particles are segregated at the point of constriction, and moreover no particles or only few particles get into the surroundings with the partial volumetric flow that is given off into the surroundings, or have to be filtered out at an upstream air filter.

The gas outlet of the ground-material particle removal device in this case advantageously opens out upstream of the branch into the gas-excess outlet line into the connecting line between the mill and the classifier, whereas the ground-material particle discharge of the ground-material particle removal device advantageously opens out downstream of the branch into the gas-excess outlet line into the connecting line connecting the mill and the wind classifier, the inlet of the removal device being connected to the outlet of the mill.

A further advantage of this arrangement is that the removed ground material particles do not have to make their way through long line branches, or through blowers or the like, and therefore remain cold, before they are supplied to the wind classifier, which significantly improves the classifying results.

With particular preference, the transporting gas outlet of the cyclone separator or the gas outlet of the ground-material particle removal device may also be connected to a return line of the line network that opens out upstream of the mill into the mill supply section, preferably between the low-temperature embrittling device and the mill. An open-loop and/or closed-loop controlled throttle may also be arranged in the return line.

When required, the mill can then suck in a still relatively cold gas return stream. This means that, if the suction pressure at the input of the mill rises on account of a rising temperature, and resultant boosted suction intake power of the mill, the suction pressure from the wind classifier remains the same, and part of the amount of gas at the transporting gas outlet can be sucked back to the input side of the mill. As a result, the fraction of transporting gas of the mill-output volumetric flow that is superfluous at this moment is removed and, instead of being blown away into the surroundings, is used on the input side of the mill, which contributes to economical handling of the relatively expensive low-temperature gas.

According to an aspect of the invention, the wind classifier has a return to the input side of the mill. For this purpose, the wind classifier has a coarse-fraction discharge connected to a return line opening out upstream of the mill—preferably upstream of the low-temperature embrittling device on account of the particle temperature which, though still cold in comparison with the surroundings, is in the meantime nevertheless relatively high in comparison with the temperature of the low-temperature embrittling device—in order to supply to the mill the coarse fraction segregated from the ground material particles to be classified at the wind classifier. The coarse material separated off at the coarse-fraction discharge can then be returned while still relatively cold directly to the mill or upstream of the low-temperature embrittling device, whereby a considerable cost reduction is likewise achieved on account of the saving in low-temperature gas and the use of the segregated coarse-material fraction.

According to yet another aspect of the invention, the line network has a circulating line which branches off from the gas-excess outlet line, preferably downstream of the blower, and opens out again into the connecting line downstream of the branch of the gas-excess outlet line.

It goes without saying that suitable valves may be provided in the various line branches in order to open or close them, for example in response to a control of the volumetric-flow reforming device. In particular, it is advantageous if the number of gas-diverting actuators have a throttle damper in the circulating line and/or in a circulating line portion of the classifier circulating line situated downstream of the branch to the classifier-circuit outlet line and/or if the plurality of gas-diverting actuators has a throttle damper in the connecting line upstream and/or downstream of the branch of the gas-excess outlet line.

BRIEF DESCRIPTION OF THE DRAWING

The invention will now be described with reference to the drawings wherein.

DESCRIPTION OF THE PREFERRED EMBODIMENTS OF THE INVENTION

Figure 1:
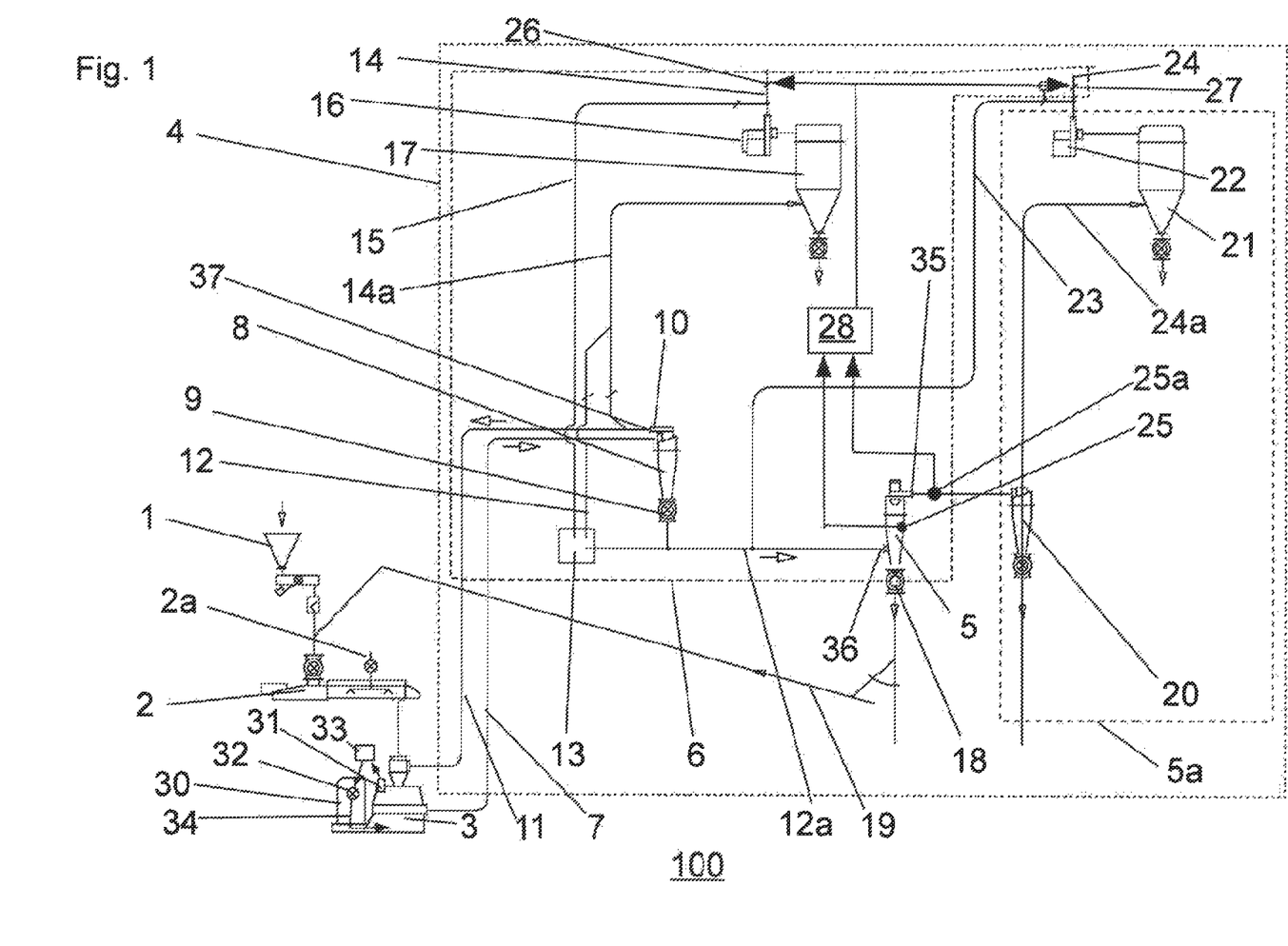
FIG. 1 is a schematic illustration of a cryogenic grinding apparatus according to an exemplary embodiment of the invention.

FIG. 1 shows a cryogenic grinding apparatus 100 for carrying out a cryogenic grinding process. The cryogenic grinding apparatus 100 is suitable in particular for producing powdered rubber from rubber granules with rubber-granule particle diameters of 0-6 mm. The cryogenic grinding apparatus 100 has a coarse material charge, which is denoted by 1 and at which the rubber granules, or some other material that is difficult to grind, is charged. From the coarse material charge 1, the material to be ground passes to a low-temperature embrittling device 2, advantageously formed as a cooling screw, at which it is for example charged via a rotary-vane feeder.

The low-temperature embrittling device 2, formed as a screw feeder or cooling screw, has in this case along with the input for the coarse material to be embrittled a connection 2a, which is connected to a liquefied gas container, which is a low temperature gas source 30, for example a pressure vessel filled with liquid nitrogen. The liquefied nitrogen, or some other inert gas kept in a liquid state, is then injected via the connection 2a into the interior space, for example tubular interior space, of the preferably heat-insulated low-temperature embrittling device 2, through which a feeding screw extends, which feeds the coarse material introduced at the input through the interior space enclosed by the insulating tube to an output at the other end of the tube. The liquefied gas provides a low temperature in the interior space of the low-temperature embrittling device 2 that is well within the negative ° C. range and cools and embrittles the charged material particles to be ground, while at least partially undergoing evaporation. For example, nitrogen has a boiling point of −196° C. at the normal pressure prevailing in the low-temperature embrittling device 2.

From the output of the low-temperature embrittling device 2, the embrittled coarse material passes together with the injected liquefied gas, which has now at least partly evaporated but still has a temperature in the at least two-digit negative ° C. range, to the input or the material charge of a mill 3, preferably formed as a whirlwind mill. In response to an output of a temperature sensor 31, a valve 32 in a supplementary-gas line, which optionally connects the mill 3 with the liquefied gas container, is in this case controlled by a mill-temperature control device 33. The supplementary-gas line forms a low-temperature gas feeding line 34.

Figure 2:
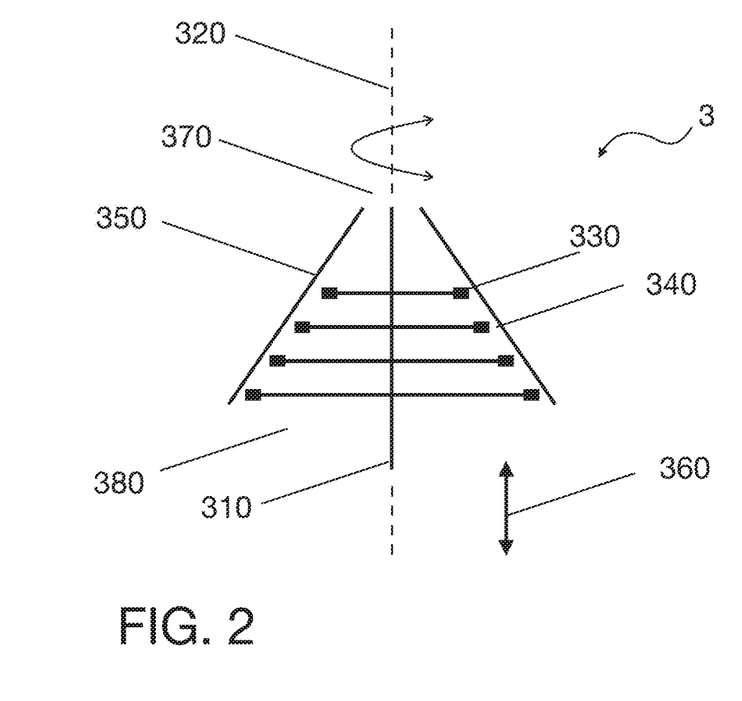
FIG. 2 is a schematic illustration of a whirlwind mill according to an exemplary embodiment of the invention.

As shown in FIG. 2, Mill 3 has a rotor 310 with a vertical axis of rotation 320, which bears a plurality of metal plates 330, which are surrounded at the outer circumference by a grinding path, in order to form a grinding gap 340 between the rotor 310 and the stator 350 bearing the grinding path. The grinding gap 340 in this case preferably runs conically downward, so that its width can be set by way of a height adjustment indicated by arrows 360 of the rotor 310. The coarse material must in this case pass the grinding gap 340 on its way from the mill input 370 to a mill output 380, and is thereby flung back and forth between the metal plates 330 on the rotor 310 and the grinding path on the stator 350, and as a result is ground.

During the grinding, a low-temperature in the at least two-digit negative ° C. range still continues to prevail in the mill 3, since the gas atmosphere in the mill is dominated by the low-temperature gas added directly via the supplementary-gas line or via the low-temperature embrittling device 2, and consists at least to the greatest extent of this low-temperature gas.

The mill housing is in this case also advantageously heat-insulated. The temperature may in this case be controlled such that, depending on whether the recorded temperature in the mill lies below a setpoint value of for example −60° or −70° C., more or less gas is allowed into the mill 3.

The temperature control of the mill 3 in this case brings about a rising and falling supply of refrigerating medium, and consequently a changing mill-output volumetric flow, in which the material to be ground into fine powder and the low-temperature gas from the gas atmosphere in the mill interior space is contained, which although heated somewhat in the course of the grinding operation, is still well within the two-digit negative ° C. range.

In order to separate off the ground material particles contained in the mill-output volumetric flow that have the desired fineness, the diameter of which is therefore below a desired upper grain limit, from the mill-output volumetric flow, a separating device denoted overall by 4 is provided and is connected to the mill via a mill-output line 7 connected to the mill output. The line 7 as well as all other lines of the installation are preferably heat-insulated.

The actual separation cut, that is, the separation of the fine material fraction below a predetermined grain limit from a coarse material fraction, takes place in this case in a wind classifier 5, the classifier wheel of which defines the upper grain limit. The mill-output volumetric flow cannot, however, be supplied to the wind classifier 5 in this case, because it is unsuitable for this on account of the pulsations induced by the temperature control of the mill 3. This is because the wind classifier 5 requires an at least relatively constant classifier-input volumetric flow, which is accomplished by its classifier wheel rotating at a constant rotational speed. Arranged between the mill output and the classifier input are therefore a ground-material particle removal device 8 and a directing device 6, which remove from the mill-output volumetric flow a feed gas fraction that is suitable for the wind classifier 5 and is smoothened over time, and the ground material to be classified, and feed these into a classifier-input volumetric flow. Excess grinding gas is discharged into the surroundings. The directing device 6 in this case includes a wide variety of lines, sensors, actuators and a controller 12, 12a, 14, 14a, 15, 25, 25a, 26, 27, 28, which will be discussed later, but not the cyclone separator serving as the ground-material particle removal device 8.

In the classifier chamber of the wind classifier 5, the introduced ground material particles are sucked up by the classifier wheel rise. Ground material particles that are too heavy sink downward, where they reach a coarse-material discharge denoted by 18, at which the coarse-material fraction is discharged from the wind classifier 5. The risen ground material particles are then either rejected at the classifier wheel located above the classifier chamber, and fall back into the classifier chamber, or pass through the classifier wheel to the classifier output and together with the transporting gas sucked through the classifier wheel enter an after-separating device, which is denoted by 5a. The ground material particles of the fine-material fraction are removed from the classifier-output volumetric flow at the after-separating device 5a and the transporting gas contained in the classifier-output volumetric flow is cleaned and discharged into the surroundings.

From the coarse-material discharge 18 of the wind classifier 5, a return line 19 leads back to the input side of the mill and opens out there into the downcoming line connecting the coarse-material charge 1 to the low-temperature embrittling device 2. The coarse material segregated at the classifier 5 is supplied once again to the cryogenic grinding process. In this case, the coarse material returned by the classifier 5 is still at a temperature in the two-digit ° C. range below zero, and therefore no longer has to be cooled as much as the newly charged material to be ground, so that not only is there generally a situation in which the returned coarse material is used, but there is also a saving of liquefied gas and consequently altogether an improved yield of fine material with less use of energy.

The mill-output volumetric flow discharged by the mill 3 in this case passes through the mill-output line 7 initially into the ground-material particle removal device 8, advantageously into a cyclone separator 8, into the input of which the mill-output line 7 leads. In the cyclone separator 8, a large part of the ground-material particle load of the mill-output volumetric flow, in practice about 98% thereof, is separated off from the mill-output volumetric flow and passes into a particle discharge 9, preferably provided with a rotary-vane feeder, of the cyclone separator 8. On the other hand, the transporting gas stream with the remaining, small fraction of ground material particles leaves the cyclone separator 8 at a transporting gas outlet 10.

The transporting gas stream, which is then virtually unladen with ground material particles, contains the low-temperature gas injected in the low-temperature embrittling device 2 and also at least in significant parts consists thereof, can then be divided up into a feed gas fraction, which is fed to the classifier-input volumetric flow, and a gas excess, which is discharged via a gas-excess outlet line 14 into the surroundings. For this purpose, the transporting gas outlet line 10 of the cyclone separator 8 is connected to a connecting line 12, 12a, which leads to the wind classifier 5 and from which a branch line 14a branches off, which leads to the gas-excess outlet line 14.

The line branch 12 forms with the mill-output line 7 leading from the mill 3 to the cyclone separator 8 and the line portion 12a connecting to the line branch 12 a line branch 7, 12, 12a altogether connecting the mill 3 and the wind classifier 5, a further circulating line 15, coming from the gas-excess outlet line 14, opening out at the connecting part 13 (for example a T-pipe piece).

Arranged in the line branch 14a is a blower 16, and also an upstream air filter 17. The blower 16 sucks a part of the grinding gas through the air filter 17 with a predetermined constant suction power, the remaining ground material particles that are contained in the transporting gas of the partial volumetric flow being separated off here. The partial volumetric flow, then completely freed of ground material particles, can then be blown out at the gas-excess outlet line 14, without polluting the environment with dust and keeping below the legally prescribed amount of residual dust, or in the case of a closed throttle damper 26 be returned through the circulating line 15 into the connecting line 12, 12a.

Corresponding controlled or uncontrolled throttles may also be provided in the line portion 12 and the circulating line 15, as indicated by crossbars. Downstream of the connecting part 13 of the circulating line 15, into the line branch 7, 12, 12a connecting the mill 3 and the wind classifier 5, in the line portion 12a that leads to the wind classifier 5 there also opens out a downcoming pipe, which comes from the product discharge 9 of the cyclone separator 8 and by which the classifier-input volumetric flow is laden with the ground material.

Furthermore, the transporting gas outlet 10 of the cyclone separator 8 is also followed by a return line 11, which leads back from there to the mill input and opens out between the low-temperature embrittling device 2 and the mill 3 at the product charge on the upper side of the mill 3.

Along with the line network 12, 12a, 14a, 15, configured as a multiply branched circuit 12, 12a, 14a, 15 with a gas-excess outlet line 14, between the removal device 8 and the wind classifier 5, the cryogenic grinding apparatus has on the classifier side a similar circulating line arrangement with a controlled outlet.

From the classifier wheel output 35 of the wind classifier 5, a classifier circulating line 24a, 23 leads, with a circulating line portion 24a, through an after-separating cyclone separator 20, an air filter 21 and a blower 22 back to a classifier input side 36, to be specific into the connecting line 12, 12a. Downstream of the blower a classifier-circuit outlet line 24 branches off, which leads into the surroundings and in which a throttle damper 27 is arranged.

The throttle damper 26 in the gas-excess outlet 14 and the throttle damper 27 in the classifier outlet 24 are in this case set by controller 28 in response to an output of a detection device 25, 25a, which is formed by an 02 sensor 25a downstream of the classifier wheel outlet and a temperature sensor 25 in the interior of the wind classifier 5. The throttle damper 26 and the throttle damper 27 are gas-directing actuators 26 and 27.

Depending on whether or not an excessive temperature or an excessive oxygen content is reported, the controller opens the classifier outlet 24 and closes the gas-excess outlet 14, so that cold grinding gas can flow in a replenishing sense into the classifier circuit, or closes the classifier outlet 24 and opens the gas-excess outlet 14, so that all of the grinding gas is discharged into the surroundings. It goes without saying that intermediate positions of the two throttle dampers 26, 27 are possible. The further throttle dampers, indicated by crossbars, can of course likewise be controlled in an open-loop and/or closed-loop manner by the controller 28.

Downstream of the cyclone separator 8, the mill-output volumetric flow discharged by the mill 3 under pressure surges and density fluctuations is divided in respect of its transporting gas fraction between a number of alternative routes, depending on the position of the throttle dampers: firstly, the route directly to the wind classifier 5 via the line portion 12 and the further line portion 12a may be chosen, also the route to the wind classifier 5 via the line branch 14a leading to the gas-excess outlet 14, the return line branch 15 and the line branch 12a may be chosen; on the other hand, excess transporting gas may be blown out into the surroundings via the line branch 14a leading to the partial-stream outlet 14 and the partial-stream outlet 14, or it may reach the inlet side of the mill 3 via the return line 11.

Depending on the momentary pressure conditions that are caused by the pressure resistance of the classifier wheel of the wind classifier 5, and also the suction power of the blower 16, a further blower 22, and the mill 3, and also on account of the position of the throttle damper 26 in the gas-excess outlet 14 and a further throttle damper 27, the greater part of the transporting gas volumetric flow is then sucked directly to the wind classifier 5 or is sucked to the input side of the mill 3, for instance when an acceleration of the mill 3 is commencing on account of a rising temperature there, or is sucked in by the blower 16 and blown out at the partial-stream outlet 14. In this case, the further throttle valves, indicated by crossbars, may also open or close the respective line branches or open or close them to a certain degree.

The separating device 5a arranged downstream of the wind classifier 5 in terms of flow has in turn a cyclone separator, which is denoted by 20. At the cyclone separator 20 of the after-separating device 5a, the classifier-output volumetric flow, which is then only laden with the fine material, is freed of by far the predominant majority of the fine material particles, which are removed at the product discharge of the cyclone separator 20. The residual gas stream is then sucked by the blower 22 through an air filter 21 and thereby freed of the residual fine material particles, in order to be able to be blown away into the surroundings in a cleaned form through the classifier-circuit outlet line 24.

It is understood that the foregoing description is that of the preferred embodiments of the invention and that various changes and modifications may be made thereto without departing from the spirit and scope of the invention as defined in the appended claims.

What is claimed is:

1. A cryogenic grinding apparatus for producing fine material from a material to be ground comprising:
    a material charge for charging the material to be ground;
    a low-temperature embrittling device connected to said material charge and configured for embrittling the charged material to be ground at a low temperature by supplying a low-temperature gas;
    a whirlwind mill connected to said low-temperature embrittling device and configured for grinding the embrittled material to be ground in an atmosphere containing the supplied low-temperature gas;
    a separating device configured for separating the fine material from a mill-output volumetric flow leaving the whirlwind mill;
    said mill-output volumetric flow containing the low-temperature gas and ground material;
    said whirlwind mill comprising:
        a plurality of metal plates,
        a stator,
        a rotor with a vertical axis of rotation bearing the plurality of metal plates,
        the plurality of metal plates being surrounded at an outer circumference by a grinding path to form a grinding gap between the rotor and the stator bearing the grinding path, and
        a temperature control device configured to variably control an amount of the low-temperature gas taken up per unit of time to thereby keep a temperature during milling below a setpoint value which is in a range of −40° Celsius to −70° Celsius;
    said separating device including a wind classifier configured to separate off a classifier-output volumetric flow containing the fine material from a classifier-input volumetric flow containing the ground material;
    the classifier-input volumetric flow including pulsations induced by the temperature control device of the whirlwind mill when the temperature control device variably controls the amount of the low-temperature gas taken up per unit of time;
    the wind classifier including:
        a classifier wheel, which defines an upper grain limit by rotating at a constant rotational speed, a classifier chamber from where such particles of the ground material contained in the classifier-input volumetric flow rise, which are sucked up by the classifier wheel, and
a coarse material discharge, into which such particles of the ground material sink downward from the classifier chamber, which are too heavy to be sucked up;
a removal device connected to the mill and configured to remove the ground material from said mill-output volumetric flow; and,
a directing device comprising a line network, detection device, at least one throttle damper, and a controller in communication with the detection device and the at least one throttle damper, the directing device being configured to feed the ground material removed by the removal device into said classifier-input volumetric flow and to discharge excess mill-output gas of said mill-output volumetric flow, and
the controller being configured to smoothen said classifier-input volumetric flow over time by removing from said mill-output volumetric flow the pulsations induced by the temperature control device of the whirlwind mill by controlling the at least one throttle damper based on an output of the detection device.

2. The cryogenic grinding apparatus of claim 1, wherein:
said line network is arranged to feed said classifier-input volumetric flow with a feed gas fraction of mill output gas;
said feed gas fraction of the mill output gas is necessary for at least one of creating and maintaining a fraction of the low-temperature gas in an atmosphere in the wind classifier; and,
said line network is arranged to discharge said excess mill-output gas into surroundings of the cryogenic grinding apparatus.

3. The cryogenic grinding apparatus of claim 2, wherein:
said line network includes a connecting line and a gas-excess outlet line,
said connecting line connects said removal device with said wind classifier,
a branch line leading to said gas-excess outlet line branches off from said connecting line,
said connecting line feeds the removed ground material and the feed gas fraction into the classifier-input volumetric flow, and
said gas-excess outlet line discharges the excess mill-output gas into the surroundings.

4. The cryogenic grinding apparatus of claim 3, further comprising:
a blower; and,
an air filter arranged in said gas-excess outlet line.

5. The cryogenic grinding apparatus of claim 3, further comprising:
a classifier circulating line;
said wind classifier having a classifier wheel output and a classifier input side;
said classifier wheel output being connected to said classifier circulating line;
said classifier circulating line leading back to said classifier input side and opening out into said connecting line; and,
a classifier-circuit outlet line branching off from said classifier circulating line to discharge excess fractions of gas contained in a classifier output volumetric flow into the surroundings.

6. The cryogenic grinding apparatus of claim 5, further comprising:
a blower; and,
an air filter arranged in a circulating line portion leading to said classifier-circuit outlet line.

7. The cryogenic grinding apparatus of claim 5, wherein:
said removal device is configured for separating gas from said ground material;
said mill has a mill output and a mill-outlet line attached to the mill output;
said removal device has an inlet, a gas outlet, and a particle discharge;
said inlet is connected to said mill-outlet line;
said gas outlet opening out into the connecting line upstream of a branch into the gas-excess outlet line; and,
said particle discharge opening out downstream thereof into the connecting line.

8. The cryogenic grinding apparatus of claim 3, wherein said removal device is a cyclone separator.

9. The cryogenic grinding apparatus of claim 8, wherein said line network has a circulating line which branches off from said gas-excess outlet line and opens out into the connecting line downstream of the branch of said gas-excess outlet line.

10. The cryogenic grinding apparatus of claim 1, further comprising:
a plurality of gas-directing actuators;
said detection device being configured to detect at least one parameter of an atmosphere prevailing in said wind classifier;
said controller being configured to control the plurality of gas-directing actuators in response to the output from said detection device to feed a feed gas fraction of mill-output gas into the classifier-input volumetric flow and to discharge remaining gas into the surroundings; and,
said gas fraction of said mill-output gas being necessary for at least one of creating and maintaining at least one setpoint parameter value of said atmosphere prevailing in said wind classifier.

11. The cryogenic grinding apparatus of claim 10, wherein said detection device is configured to detect at least one of a temperature of said atmosphere prevailing in said wind classifier and a content of oxygen in said atmosphere prevailing in said wind classifier.

12. The cryogenic grinding apparatus of claim 10, wherein
said controller is configured to:
smoothen said classifier-input volumetric flow over time by removing from said mill-output volumetric flow the feed gas fraction suitable for the wind classifier, which requires its classifier-input volumetric flow to be constant, and
set said classifier-input volumetric flow to a desired setpoint volumetric flow value.

13. The cryogenic grinding apparatus of claim 10, wherein:
said line network includes a connecting line connecting the removal device and the wind classifier to feed the removed ground material and a removed fraction of the low-temperature gas into the classifier-input volumetric flow,
said line network further includes a branch line branching off from the connecting line and leading to a gas-excess outlet line to discharge the excess gas of the mill-output volumetric flow into the surroundings, and said plurality of gas-directing actuators includes a controlled throttle valve in at least one of said gas-excess outlet line and a classifier-circuit outlet line branching off from a classifier circulating line being connected to a classifier wheel output, in order to discharge excess fractions of gas contained in a classifier output volumetric flow into the surroundings.

14. The cryogenic grinding apparatus of claim 1, further comprising:
a coarse-material return line opening out upstream of said mill;
said wind classifier having a coarse-material discharge; and,
said coarse-material discharge being connected to said coarse-material return line.

15. A cryogenic grinding process for producing fine material from a material to be ground, the process comprising the steps of:
charging the material to be ground;
low-temperature embrittling the charged material to be ground subsequent to the charging by supplying low-temperature gas;
grinding low-temperature-embrittled material to be ground subsequent to the low-temperature embrittling in an atmosphere containing the supplied low-temperature gas in a whirlwind mill;
variably controlling an amount of low-temperature gas taken up per unit of time by the whirlwind mill to keep a temperature during milling below a setpoint value which is in a range of −40° Celsius to −70° Celsius, the whirlwind mill having a rotor with a vertical axis of rotation, which bears a plurality of metal plates, which are surrounded at the outer circumference by a grinding path in order to form a grinding gap between the rotor and a stator bearing the grinding path;
separating the fine material from a volumetric flow subsequent to the grinding;
said volumetric flow including ground material and a grinding gas containing the low-temperature gas;
said separating including substeps of:
removing the ground material from the volumetric flow;
discharging the low-temperature gas;
feeding the removed ground material into a classifier-input volumetric flow of a wind classifier, the classifier-input volumetric flow including pulsations induced by a temperature control device of the whirlwind mill when the temperature control device variably controls the amount of the low-temperature gas taken up per unit of time, the classifier including:
a classifier wheel, which defines an upper grain limit by rotating at a constant rotational speed,
a classifier chamber from where such particles of the ground material contained in the classifier-input volumetric flow rise, which are sucked up by the classifier wheel, and
a coarse material discharge, into which such particles of the ground material sink downward from the classifier chamber, which are too heavy to be sucked up;
feeding a feed gas fraction of the low-temperature gas that is necessary for at least one of creating and maintaining a fraction of the low-temperature gas in an atmosphere in said wind classifier;
smoothening said classifier-input volumetric flow over time by removing from said mill-output volumetric flow the pulsations induced by the temperature control device of the whirlwind mill by controlling at least one throttle damper based on an output of a detection device; and
wind classifying the classifier input volumetric flow for separating off a classifier-output volumetric flow containing the fine material in an atmosphere in the wind classifier which contains the fraction of the low-temperature gas.

16. The cryogenic grinding process of claim 15, wherein:
said cryogenic grinding process is carried out on a cryogenic grinding apparatus,
said cryogenic grinding apparatus comprising:
a material charge for charging the material to be ground;
a low-temperature embrittling device connected to said material charge and configured for embrittling the charged material to be ground at a low temperature by supplying a low-temperature gas;
a mill connected to said low-temperature embrittling device and configured for grinding the embrittled material to be ground in an atmosphere containing the supplied low-temperature gas;
a separating device configured for separating the fine material from a mill-output volumetric flow leaving the mill;
said mill-output volumetric flow containing the low-temperature gas and ground material;
said mill is a whirlwind mill and includes a temperature control configured to variably control an amount of the low-temperature gas taken up per unit of time to thereby keep a temperature during milling below a setpoint value which is in a range of −40° Celsius to −70° Celsius;
said separating device including a wind classifier configured for separating off a classifier-output volumetric flow containing the fine material from a classifier-input volumetric flow containing the ground material;
a removal device connected to the mill and configured for removing the ground material from said mill-output volumetric flow; and
a directing device comprising a line network, detection device, at least one throttle damper, and a controller in communication with the detection device and the at least one throttle damper, the directing device being configured to feed the ground material removed by the removal device into said classifier-input volumetric flow and to discharge excess mill-output gas of said mill-output volumetric flow.

17. The cryogenic grinding process of claim 15, wherein:
said charged material to be ground is a precomminuted material to be ground; and,
said precomminuted material is rubber granules for producing powdered rubber.

18. The cryogenic grinding process of claim 17, wherein said supplied low-temperature gas is liquid nitrogen.

19. The cryogenic grinding apparatus of claim 1, wherein the grinding gap runs conically downward such that a width of the grinding gap can be set by a height adjustment of the rotor.

* * * * *